(12) United States Patent
Lee

(10) Patent No.: US 6,721,755 B1
(45) Date of Patent: Apr. 13, 2004

(54) DEVICE AND METHOD FOR AUTOMATICALLY BUILDING DATABASE FOR HOME ZONE SERVICE

(75) Inventor: Yun-Hee Lee, Songnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 190 days.

(21) Appl. No.: 09/632,996

(22) Filed: Aug. 4, 2000

(30) Foreign Application Priority Data

Aug. 4, 1999 (KR) ........................................ 1999-32036

(51) Int. Cl.$^7$ ................................................ G06F 7/00
(52) U.S. Cl. ................. 707/102; 707/104.1; 455/456.1; 455/432.1; 455/435.1
(58) Field of Search ................................ 455/432, 433, 455/435, 456; 379/142.06; 707/104.1

(56) References Cited

U.S. PATENT DOCUMENTS

| | | | | |
|---|---|---|---|---|
| 5,210,787 A | * | 5/1993 | Hayes et al. | 455/432 |
| 5,408,683 A | * | 4/1995 | Ablay et al. | 455/433 |
| 5,561,836 A | * | 10/1996 | Sowles et al. | 342/357.16 |
| 5,819,178 A | * | 10/1998 | Cropper | 455/422 |
| 5,917,811 A | * | 6/1999 | Weaver et al. | 370/332 |
| 6,038,451 A | * | 3/2000 | Syed et al. | 455/445 |
| 6,091,953 A | * | 7/2000 | Ho et al. | 455/432 |
| 6,097,942 A | * | 8/2000 | Laiho | 455/414 |
| 6,101,387 A | * | 8/2000 | Granberg et al. | 455/414 |
| 6,148,199 A | * | 11/2000 | Hoffman et al. | 455/433 |
| 6,230,017 B1 | * | 5/2001 | Andersson et al. | 455/433 |
| 6,332,075 B1 | * | 12/2001 | Verdonk | 379/373.02 |
| 6,341,220 B1 | * | 1/2002 | Hurme | 455/410 |

* cited by examiner

Primary Examiner—Greta Robinson
Assistant Examiner—Miranda Le
(74) Attorney, Agent, or Firm—Cha & Reiter, L.L.C.

(57) ABSTRACT

A device and method for automatically building a database for a home zone service in a mobile communication system. The device comprising a memory and processing unit, wherein the memory includes an address location database for storing latitude and longitude data corresponding to respective addresses, and a zone database for storing zone data for the respective locations, and wherein processor includes a client registration processor for creating a client database in the memory upon the receipt of client information, and a database processor for searching the address location database for the latitude and longitude information corresponding to the client's address when the registration of a new client is requested by the client registration processor, for searching the zone database for zone data for a location corresponding to the latitude and longitude information, and for creating a home zone database in the memory by taking the zone data as the home zone data for the client.

15 Claims, 4 Drawing Sheets

| NAME | ADDRESS | PHONE NO #1 (NSN) | PHONE NO #2 (MDN) | BS ID, SECTOR ID, RTD(MAX/MIN) | | |
|---|---|---|---|---|---|---|
| ROBERT | 23 MURRAY HIL, NEW JERSEY | 0342-779 -8180 | 011-779 -xxxx | 1, α, 16/40 | 1, β, 20/44 | 3, γ, 24/48 |
| DAVID | 31 ROCHESTER, NWE YORK | 0999-999 -9999 | 011-yyy -yyyy | 3, α, 10/34 | 4, β, 10/34 | 5, γ, 22/46 |

FIG. 2

DEVICE AND METHOD FOR AUTOMATICALLY BUILDING DATABASE FOR HOME ZONE SERVICE

CLAIM OF PRIORITY

This application makes reference to, incorporates the same herein, and claims all benefits accruing under 35 U.S.C. Section 119 from an application, "Device and Method for Automatically Building Database for Home Zone Service", filed in the Korean Industrial Property Office on Aug. 4, 1999 and there duly assigned Serial No. 99-32036.

BACKGROUND OF THE INVENTION

1. Field of the Invention

The present invention relates generally to a mobile communication system. More particularly, the present invention relates to a device and method for automatically building a database for the home zone service in a mobile communication system.

2. Description of the Related Art

Recently, various services, such as data service, pre-paid service, and home zone service, are offered by mobile communication service providers to strengthen their competitiveness. The home zone service offers a different charging rate system to mobile subscribers according to the location where the call is made. When a client talks over a mobile telephone in a specified zone that can be designated by the subscriber (e.g., near home), the client will be charged at a lower rate equivalent to a local call, and a national significant number (NSN) is used for billing purposes. However, when the client talks outside of the home zone, the client will be charged at a higher rate corresponding to the mobile service rate. In this case, a mobile directory number (MDN) is used for billing purposes.

In order to apply a different charging rate according to the location where the client uses the mobile telephone, the mobile communication service providers should have previously recorded information (i.e., classified locations defining the home zone information and information on clients registered for the home zone service) that can be used to generate different charging rates.

SUMMARY OF THE INVENTION

It is, therefore, an object of the present invention to provide a device and method for automatically building a database for identifying the home zone service for billing purposes in a mobile communication system.

According to one aspect of the present invention, the device having a memory and processing unit is provided for building a home zone database in a mobile communication, wherein the memory includes an address location database for storing latitude and longitude data corresponding to the respective addresses of the client, and a zone database for storing zone data defining the home zone coverage area by the respective base station, and wherein the processor includes a client registration processor for creating a client database in the memory upon receipt of the client information, and a database processor for searching the address location database for the latitude and longitude information corresponding to the client's address when the registration of a new client is requested by the client registration processor, for searching the zone database for the home zone coverage area corresponding to the latitude and longitude information of the client, and for creating a home zone database defining the home zone for the client.

BRIEF DESCRIPTION OF THE DRAWINGS

The above and other objects, features, and advantages of the present invention will become more apparent from the following detailed description when taken in conjunction with the accompanying drawings in which:

FIG. 2 is a diagram illustrating the client information database for a home zone service according to the embodiment of the present invention;

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

For a home zone service, it is necessary to first detect the location where the mobile telephone is presently located. Thereafter, it is determined whether the location of the mobile telephone belongs to a previously registered home zone in order to apply a different charging rate to the mobile phone subscriber.

Figure 1:
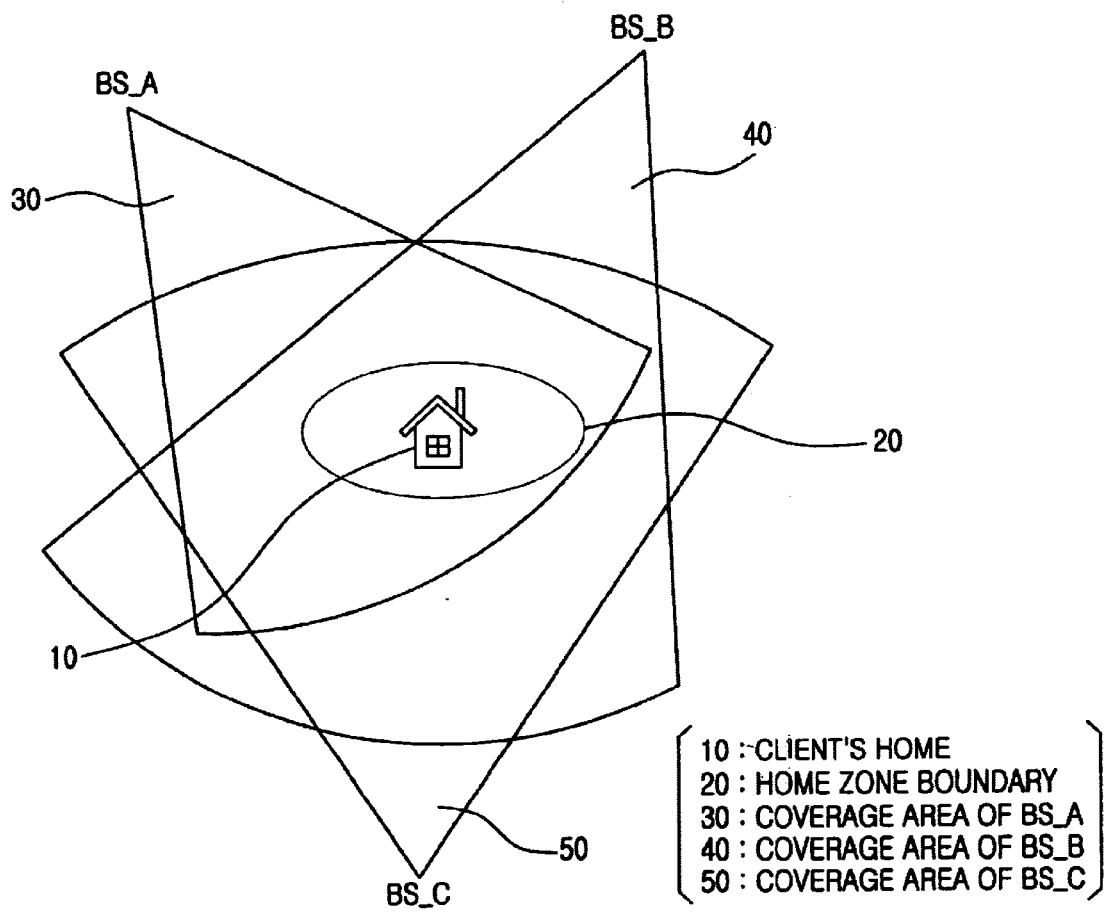
FIG. 1 is a diagram illustrating the neighbor base stations of a home zone service and their coverage areas.

FIG. 1 illustrates the neighbor base stations of the home zone service and their respective coverage areas. The reference numeral 10 depicts the residential home of a client located in the middle of the home zone. The reference numeral 20 illustrates the home zone boundary defined by a specific radius centered around the client's home 10. The reference numerals 30, 40 and 50 indicate the respective coverage areas of the base stations A, B, and C surrounding the home zone.

The boundary of a client's home zone 20 can be defined using several parameters, such as the base station ID of the servicing base station, the sector ID of the base station, and the relative distance from the neighbor base stations. Thus, these factors constitute elements for building a database for the home zone service. The relative distance from the respective base station defining the home zone boundary is represented by the minimum and the maximum distances relative to a base station. These distances can be expressed in terms of a round trip delay (RTD), which is represented by dividing the distance by the ray velocity (C=300,00 Km) and multiplying the divided value by 2 to compensate for the round trip. That is, the base station measures the round trip time by measuring a period required for a measuring signal to radiate from the base station and return from the mobile telephone. The round trip time can be represented by the following equation (1):

$$RTD\_i = 2 \times (D\_i/C) \ldots (1),$$

wherein "i" is represented by 1 or 2, and $D\_i$ represents a variable indicating the minimum distance from the base station (when i=1) and the maximum distance in the opposite direction of the minimum distance from the base station (when i=2).

FIG. 2 illustrates a client information database showing the respective home zone area assigned to two registered clients according to the embodiment of the present invention. The database contains parameters which identify the subscriber's home zone area. For example, the first client, Robert, who resides at 23 Murray Hill, N.J., uses 032–779–8180 (NSN) when located within the home zone but uses 011–779-xxxx (MDN) when located outside of the home zone. Robert's home can be serviced by three neighboring base stations and the boundary of the home zone for Robert is defined by 16–40 chips from the $\alpha$ sector of a base station #1. Here, "16" and "40' indicate the minimum and maximum RTD values, but the actual respective distance is defined in the unit of 8–20 chips from the base station to compensate for the round trip in the RTD values, thus one half of the actual measured RTD value is used. Similarly, the home zone is defined by 10–22 chips from the $\beta$ sector of a base station #2 and within 12–24 chips from the $\gamma$ sector of a base station #3. Accordingly, the home zone service area for Robert is defined by the overlap area by the respective three sectors of different base stations. Here, a single chip distance corresponds to 245 meters. The chip distance is determined by dividing the distance 3000,000 Km by 1.2244 MHz, which corresponds to the CDMA (Code Division Multiple Access) modulation frequency.

According to the present invention, the proper number of base stations required to define the home zone service varies according to the geographical characteristic surrounding the home zone, as shown in Table 1 below. Thus, the number of base stations defining the home zone service area for a particular client can be multiple.

TABLE 1

| Zones | Cell Radius | No. of BSs Required for Home Zone Service |
| --- | --- | --- |
| Building Zone | 0.4 Km | 8 |
| Large City | 2.7 Km | 6 |
| Small Town | 4.2 Km | 4 |
| Suburb | 7.3 Km | 3 |

The initial database defining the home zone service is used for providing different charging rates. Such a database is created by simulating actual working environments before initiating the home zone service. According to the present invention, an optimal database is collected by considering actual radio propagation environments and the users' calling habits, such as the location where the call is originated and the time when the user will most likely make such call origination.

When building the database to define the home zone service area, an operator has to perform the following steps manually, causing undesirable delays in generating the database. The manual steps include:

Step 1: The operator receives the address of a client when a new client provides such information to request or register for the home zone service;

Step 2: The operator determines the location of the client by looking up the address in the map and converts the location into corresponding the latitude and longitude information;

Step 3: The operator searches the network design map based on the converted latitude and longitude information. To this end, it is necessary to obtain network design information that can provide information relating to the coverage areas by each base station;

Step 4: The operator searches the network design map for the base station ID, the sector ID, and the relative distance with respect to a base station to define the home zone coverage area for the client;

Step 5: Step 4 is repeatedly performed to obtain other base stations that can provide service to the same client within a specific radius (e.g., 1 Km) with respect to the client's address;

Step 6: The operator creates a database for the client based on the results determined in Steps 4 and 5.

If there were some changes, such as a removal of the servicing base station, steps 3 to 6 are performed again for every client in the corresponding zone where the base station was removed. In addition, if a client changes residency, steps 1 to 6 have to be executed again for the client.

Figure 3:
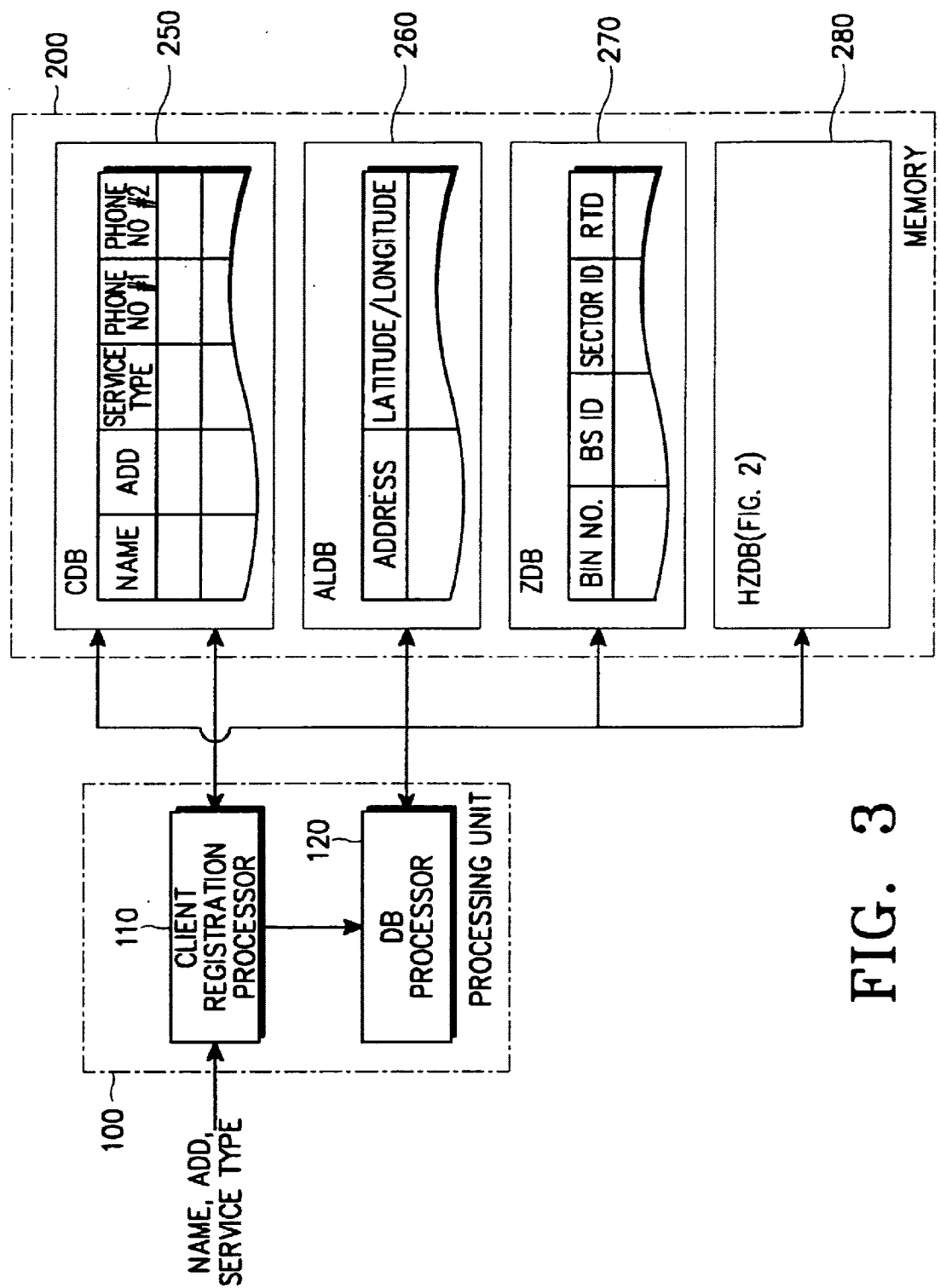
FIG. 3 is a diagram illustrating a system for building a database for the home zone service according to the embodiment of the present invention; and, FIG. 4 is a flow chart illustrating a method for building a database for the home zone service according to the embodiment of the present invention.

Therefore, as clients increase in number, it is necessary to automate partially or wholly the process of building the database to shorten the processing time of determining whether a client is within the home zone. To this end, FIG. 3 illustrates a system for building a database for the home zone service according to the embodiment of the presently illustrated invention. The inventive system includes a memory 200 and a processing unit as shown in FIG. 3. The memory 200 includes a client database (CDB) 250, an address location database (ALDB) 260, a zone database (ZDB) 270, and a home zone database (HZDB) 280.

The client database 250 stores data (i.e., name, address, service type, telephone number #1 (e.g., NSN) and telephone number #2 (e.g., MDN)) which is registered when a client (or subscriber) requests the registration of the home zone service or when a client requests the home zone service.

The address location database 260 stores location information (i.e., latitude and longitude data) corresponding to every address within the network.

The zone database 270 includes zone data (i.e., base station ID, sector ID, and RTD values) for every location using a cell planning tool. The cell planning tool is a software application for simulating radio environments. There are several radio environment analysis models used in the cell planning tool (e.g., Okumura, HATA, Cost 231, Ray tracing). According to the embodiment of the present invention, a handoff server function and the N-th likely server functions from the cell planning tool are used.

The handoff server function equipped with the network configuration information and the landescape information is used to identify the handoff zone according to the signal-to-noise (S/N) ratio (or Ec/Io in a CDMA system). That is, a predetermined threshold value is used to select the surrounding base stations to a given location which can provide an acceptable service. Accordingly, the handoff server function indicates the names and the number of the base stations that can perform soft or softer handoff to a particular location. This function is used for a wider home zone radius of over 1 km. Thus, all the base stations supporting the handoff within a given location can be determined.

The N-th likely server function derives information corresponding to the maximum number of base stations which transmit forward channel signals with the strength higher than a specific value in a given location. This function is used for the narrow home zone radius to about 500m. Here, the number of base stations is determined according to the geographical characteristics, as shown in Table 1.

By applying an actual landscape database (now shown) simulating the actual propagation environments in the cell planning tool software, it is possible to calculate radio wave strength prediction values that can be used to define the home zone area. Accordingly, the respective coverage areas of the base stations are determined by simulating the actual radio wave characteristics of a real mobile service environment. To this end, the actual RTD values measured by the base stations within the network (i.e., during the time of the day that a client will likely be in the home zone) are applied to the computer generated simulation values to derive optimal RTD values.

Although the RTD initially has a calculated value at each location, it is compensated (or modified) to an RTD value measured by the base station at a time when there is the highest probability that the client will stay in the home zone, in order to compensate for an error due to the actual radio environment.

A processing unit 100 includes a client registration processor 110 and a database processor 120. The client registration processor 110 generates the client database 250 and stores client information therein upon detecting the registration of a new client or upon detecting a request for the home zone service. Then, the database processor 120 searches the address location database 260 for the latitude and the longitude information corresponding to the client's address and creates the home zone database 280 based on the information provided by the zone data database 270, which is generated by the data base processor 124 and contains the home zone area of the respective base stations relative to the mobile client.

Figure 4:
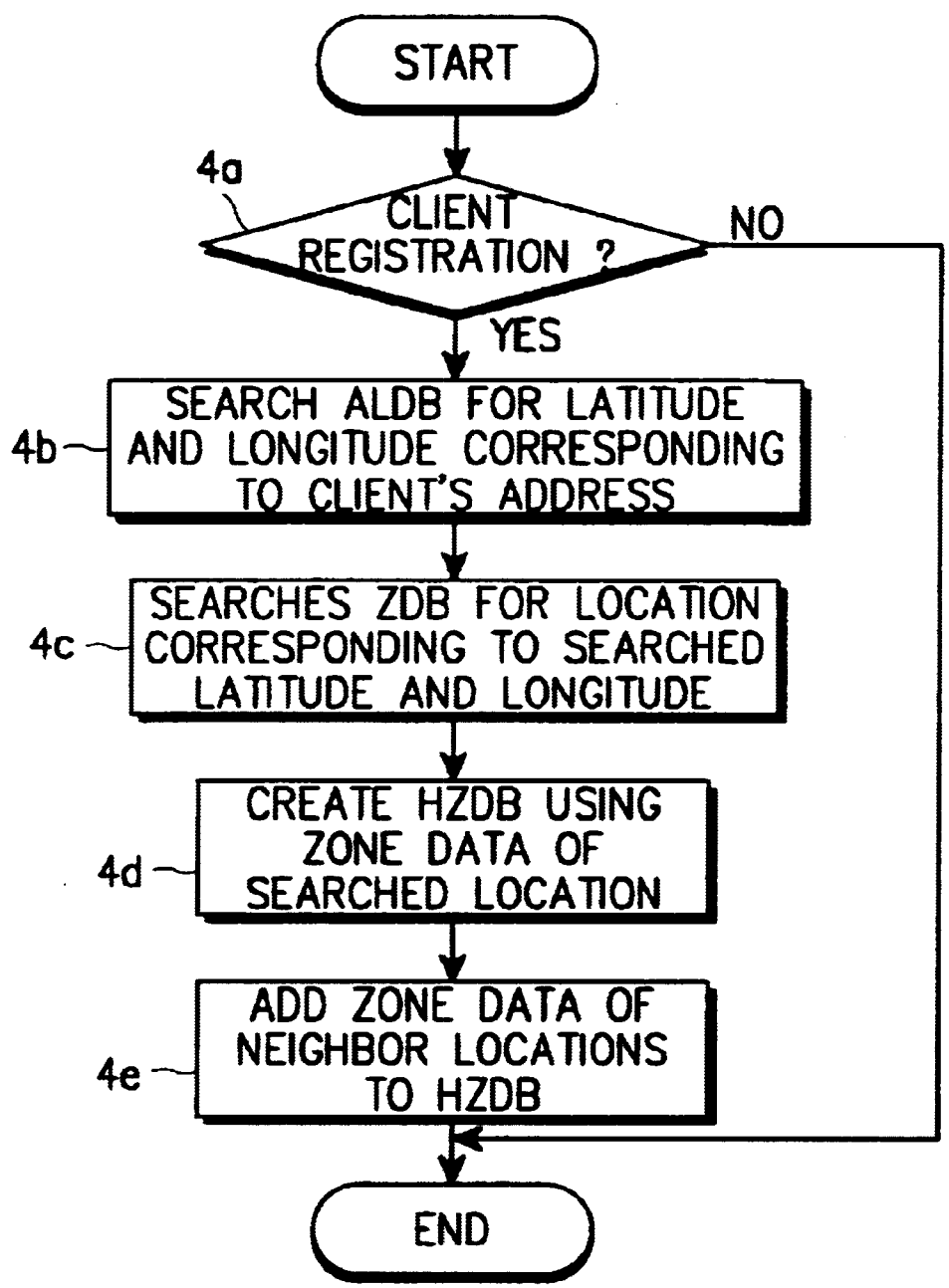

FIG. 4 illustrates a method for building a database for the home zone service according to the embodiment of the present invention.

To request (or register) the home zone service, the client will provide his or her name and address to the operator. When the operator inputs the client's name and address to the system, the client registration processor 110 of FIG. 3 will generate the client database 250.

The database processor 120 determines in step 4a whether a new client has been registered. Upon detecting the registration of a new client, the database processor 120 searches the address location database 260 for the latitude and the longitude information corresponding to the client's address in step 4b. Thereafter, in step 4c, the database processor 120 searches the zone database 270 for the location corresponding to the searched latitude and longitude. The database processor 120 searches the zone data (i.e., base station ID, sector ID, and RTD) for the searched zone in step 4d in order to create the home zone database 280. In step 4e, the database processor 120 searches other base stations located within a specific distance from the client that can be used to further define the home zone area and store the determined base stations in the home zone database 280.

The home zone database created through the above process is stored in the base station or an operating center. By comparing the stored database with the presently measured location of the mobile telephone, it can determine whether the mobile telephone is located within the home zone. Based on this determination, it is possible to determine whether to apply different charging rates to the subscriber.

As described above, the invention can automatically build an accurate client database for the home zone service.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A device for building a database for a home zone service in a mobile communication system having a plurality of base stations, comprising:

a memory means having an address location database for storing a predetermined latitude and longitude information corresponding to an address of a client, and a zone database for storing a predetermined home zone information corresponding to said latitude and longitude information;

a client registration processor for generating a client database in said memory means upon receiving the address of said client; and, a database processor for searching said address location database for said latitude and longitude corresponding to the address of said client, for searching said zone database for said home zone information corresponding to said searched latitude and longitude, and for generating a home zone database in said memory means to store said searched home zone information, wherein said home zone information includes an identification number and a sector identification number of a base station, and a minimum round trip delay and a maximum round trip delay values for defining boundary of said home zone service.

2. The device as claimed in claim 1, wherein said database processor searches other home zone information in said zone database corresponding to the address of said client to be stored in said home zone database.

3. The device as claimed in claim 1, wherein said client registration processor generates said client database based on the information received from said client, said information includes the type of service requested by said client, a home zone telephone number, and a non-home zone telephone number.

4. The device as claimed in claim 3, wherein said minimum and maximum round trip delay values are determined using a cell planning tool software.

5. A device for automatically registering a database to define the boundary of a home zone service in a mobile communication system having a plurality of base stations, comprising a memory means including:

a client database for storing a client's information;

an address location database for storing the latitude and longitude information corresponding to said client's information;

a zone database for storing a plurality of base station coverage areas corresponding to said latitude and longitude information; and, a home zone database for storing said base station coverage areas, defining the bounty of said home zone service; and a processing means including:

a client registration processor for generating said client database upon receiving a registration request for said home zone service; and, a database processor for searching said address location database for said latitude and longitude information in response to said registration request, and for searching said zone database for said base station coverage area corresponding to said searched latitude and longitude information, wherein said base station coverage area is defined by a base station identification number, a sector identification number, and a minimum and maximum round trip delay values.

6. The device as claimed in claim 5, wherein said client registration processor generates said client database based on information received from the client, said information including the type of service requested by said client, a home zone telephone number, and a non-home zone telephone number.

7. The device as claimed in claim 8, wherein said round trip delay values are determined using a cell planning tool software.

8. A method for building a database for a home zone service in a mobile communication system having a plurality of base stations, which includes a predetermined address location database for storing latitude and longitude information corresponding to a client's addresses, and a predetermined zone database for storing the different home zone information of a plurality of base stations corresponding to said latitude and longitude information, said method comprising the steps of:

(a) receiving an address in response to a request to register for said home zone service from a client;

(b) searching said predetermined address location database for said latitude and longitude information corresponding to said address;

(c) searching said predetermined zone database for the home zone information of a base station corresponding to said searched latitude and longitude; and, (d) generating a home zone database based on said searched home zone information, wherein said home zone information further includes a minimum round trip delay and a maximum round trip delay values for defining the boundary of said home zone service.

9. The method as claimed in claim 8, further comprising the steps of:

(e) searching said predetermined zone database for the home zone information of other base stations in communication with said client; and, (f) adding the home zone information of said other base stations in said home zone database.

10. The method as claimed in claim 8, wherein said home zone information includes the identification numbers of said base station and a sector identification number of said base stations.

11. The method as claimed in claim 3, wherein said minimum and said maximum round trip delay values are determined using a cell planning tool software.

12. The device of claim 1, wherein said home zone information pertains to a home zone defined by a specific radius around and centered within the client's home.

13. The device of claim 5, wherein said boundary of said home zone service is defined by a specific radius around and centered within the client's home.

14. The method of claim 8, wherein said home zone information pertains to a home zone defined by a specific radius around and centered within a home of said client.

15. The method of claim 8, wherein said predetermined zone database stores said different home zone information of said plurality of base stations.

* * * * *